United States Patent [19]
Harris et al.

[11] Patent Number: 6,099,680
[45] Date of Patent: *Aug. 8, 2000

[54] METHOD FOR CREATING A BOND ENHANCEMENT LAYER FOR THERMOPLASTIC URETHANE PANELS

[75] Inventors: Jay Harris, Mesa; Robert Seifried, Tucson, both of Ariz.

[73] Assignee: Hexcel Corporation, Pleasanton, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/609,033

[22] Filed: Feb. 29, 1996

[51] Int. Cl.$^7$ .................................................. B29D 24/00
[52] U.S. Cl. .......................... 156/279; 156/280; 156/290; 156/306.6
[58] Field of Search ................................. 156/279, 89.22, 156/197, 280, 290, 306.6, 306.9, 307.1, 307.3, 309.6; 181/292

[56] References Cited

U.S. PATENT DOCUMENTS

| | | | |
|---|---|---|---|
| 3,137,604 | 6/1964 | Bosch | 156/207 |
| 4,084,366 | 4/1978 | Saylor et al. | 181/292 |
| 4,353,947 | 10/1982 | Northcutt | 156/290 |
| 4,496,024 | 1/1985 | Wolf et al. | 156/290 |
| 4,800,119 | 1/1989 | Kolar | 156/279 |

FOREIGN PATENT DOCUMENTS

| | | |
|---|---|---|
| 0 007 857 A1 | 2/1980 | European Pat. Off. . |
| 61-209150A | of 1986 | Japan . |
| WO 87/02002 | 10/1987 | WIPO . |

OTHER PUBLICATIONS

Kirk–Othmer Encyclopedia of Chemical Technology, Martin Grayson, Executive Editor, Wiley–Interscience, John Wiley and Sons, NY, vol. 18, pp. 184–185.

*Primary Examiner*—Jan H. Silbaugh
*Assistant Examiner*—Kenneth M. Jones
*Attorney, Agent, or Firm*—Townsend and Townsend and Crew LLP

[57] ABSTRACT

Methods of improving the bondability of thermoplastic plastic substrates are described. In the methods, a bondable substrate is adhered to a thermoplastic plastic material of choice through mechanical, thermal, or chemical procedures, resulting in bond-enhanced thermoplastic materials. In one example, a urethane honeycomb panel with bond enhancement substrates is described. Thermoplastic panels with bond enhancement layers are laminated to secondary materials such as metal or plastic by applying an adhesive to the bond enhancement layer and adhering the secondary material.

5 Claims, 1 Drawing Sheet

METHOD FOR CREATING A BOND ENHANCEMENT LAYER FOR THERMOPLASTIC URETHANE PANELS

FIELD OF THE INVENTION

This invention relates to the creation of bond enhancement layers on thermoplastic panels.

BACKGROUND OF THE INVENTION

Plastics are classified as thermoplastic resins or as thermosetting resins, depending on how the plastic is affected by heat. When heated, thermoplastic resins soften and flow as liquids; when cooled, they solidify. These changes on heating and cooling can be repeated. Thermoplastics are thermally stable in their intended applications. Generally, thermoplastic products are made by melting thermoplastic compounds, and shaping and cooling the melt.

When heated, thermosetting resins liquify and then solidify with continued heating due to crosslinking of the plastic during heating. Crosslinking is a permanent change; once molded, a thermoset plastic cannot be reheated and remolded. In contrast, thermoplastic parts can be reworked.

Honeycombs are used as structural elements where a combination of lightness and strength is desirable. Plastics have been used in the manufacture of a variety of honeycomb structural elements such as panels. Polyimide film honeycomb panels are described in U.S. Pat. No. 4,921,745. Fiber reinforced polyimide honeycomb structures for high temperature applications are described in allowed U.S. patent application Ser. No. 08/261,377. Formable honeycomb panels are described in U.S. Pat. No. 4,859,517. Methods for making thermally fused thermoplastic honeycomb structures are described in U.S. Pat. No. 5,421,935. Multi-layer honeycomb structures are described in U.S. Pat. No. 5,106,688.

One problem with plastics such as thermoplastic urethane honeycomb panels is that it is difficult to adhere materials to the plastic. The present invention overcomes this and other problems.

SUMMARY OF THE INVENTION

It is now discovered that standard methods of improving the bondability of surfaces, such as sanding, or other mechanical abrasion methods, do not make thermoplastic surfaces bondable. The present invention provides methods for improving the bondability of thermoplastic surfaces, and related laminate compositions by applying a bondable substrate to the thermoplastic surface.

In one class of embodiments, the present invention provides a method of making a bondable thermoplastic surface. In the method, a bond enhancement substrate such as fiberglass cloth or Nomex® dust is chemically or mechanically adhered to a thermoplastic surface to create a bond enhancement layer. The bond enhancement layer provides a surface to which standard adhesives (such as adhesive pastes or sprays) adhere, allowing for the attachment of a broad array of materials to the thermoplastic surface.

In this class of embodiments, the bond enhancement substrate can be adhered to the thermoplastic panel, e.g., using a thermoplastic cement, or by heating the thermoplastic panel and embedding the bond enhancement substrate in the thermoplastic material in a heat lamination process, or by mechanically adhering the bond enhancement substrate to the thermoplastic panel with threads, staples, or the like.

In one preferred embodiment, when a thermoplastic cement is used, the cement is a solution of a dissolved thermoplastic material of the type from which the panel is formed. For instance, a preferred thermoplastic cement for a urethane panel is a solution of N-methyl-2-pyrolidine with urethane dissolved in the solution to achieve about 30% solids. The solution is applied directly to the panel, or to the bond enhancement substrate, and the bond enhancement substrate is applied to the panel. Once cured, the thermoplastic coated bond enhancement substrate is embedded in the surface of the thermoplastic panel, thereby creating a bond enhancement layer. Any of the methods of attaching the bond enhancement substrate to the panel preferably fix the bond enhancement substrate to the panel with an adhesive force which exceeds the cohesive strength of the panel.

A variety of materials are adhered to thermoplastic surfaces which have a bond enhancement substrate. For example, in a preferred embodiment, the invention provides a method of bonding a thermoplastic panel with a bond enhancement substrate to a second panel such as a thermoset panel or a metal panel. In this embodiment, the thermoplastic panel with the bond enhancement layer described above is bonded to a second panel by applying an adhesive to the bond enhancement layer, or to the second panel, and adhering the second panel to the bond enhancement layer. Materials used in the second panel are metals, plastics, woods, composites and the like which can be adhered to the bond enhancement substrate with an adhesive.

A preferred type of thermoplastic panel to which a bond enhancement layer is added is a honeycomb panel, which is used, e.g., where a combination of strength and lightness is desired. Preferred honeycomb panels typically have a layer of cells or honeycomb as a structural element, often between flat sheets of thermoplastic material. These cells are typically adjoining n-sided polygon cylinders where the number of sides is between 3 and 20, more preferably between 6 and 10, most preferably about 6, or are optionally comprised of adjoining circular cylinders.

A preferred honeycomb panel with a bond enhancement layer of the invention comprises an array of honeycomb cells with a bond enhancement layer comprising a bond enhancement material or "substrate" adjacent to the honeycomb cells. The bond enhancement material is disposed along the surface of the bond enhancement layer. Typically, the array of honeycomb cells is sandwiched between two sheets of thermoplastic urethane, with one or both of the sheets of thermoplastic urethane having bond enhancement materials such as fiberglass cloth embedded in the sheets.

In another embodiment, the invention provides laminates, e.g., made by the methods described above. For instance, the invention provides a laminate comprising a bond enhancement layer and a thermoplastic panel bonded to a second panel. In a preferred embodiment, the bond enhancement layer comprises a thermoplastic impregnated bond enhancement substrate bonded directly to the thermoplastic panel as described above. The bond enhancement layer is bonded indirectly to the second panel with an adhesive. In preferred embodiments, the thermoplastic panel is a polyurethane panel and the bond enhancement substrate comprises a fiberglass sheet. In a particularly preferred embodiment, the bond enhancement substrate is embedded in a urethane panel by either the heat lamination or thermoplastic cement method described above. In one form of this embodiment, the thermoplastic urethane panel comprises an array of honeycomb cells sandwiched between two sheets of thermoplastic urethane, with one or both of the sheets of thermoplastic urethane having embedded bond enhancement layers.

In one preferred laminate, the bond enhancement substrate is directly adhered to the thermoplastic panel with a thermoplastic urethane solution comprising an N-methyl 2-pyrolidine based solvent, which has about 30% dissolved thermoplastic urethane. After the thermoplastic urethane solution cures, a bond enhancement layer is formed in which the bond enhancement substrate is embedded in the matrix of the thermoplastic panel.

The second panel of the laminate is of a material which can be attached to the bond enhancement layer with an adhesive. Preferred materials include metals such as steel, copper or aluminum, plastics such as thermosetting and thermoplastic materials, woods, composites and the like.

Panels are flat or curved, and optionally include details such as channels, grooves, depressions and the like.

DESCRIPTION OF THE PREFERRED EMBODIMENT

The present invention derives from the discovery of a problem not previously known to exist, and from the discovery of unique solutions to the problem. In particular, it is now discovered that thermoplastic materials such as thermoplastic urethane panels do not bond well to other materials such as thermosetting plastics, and metals using standard techniques for preparation of the panels. In particular, a variety of sanding and mechanical abrasion techniques were used unsuccessfully on thermoplastic urethane honeycomb panels in an attempt to create a bondable surface on the thermoplastic panels. Upon the discovery that these methods did not make the panel bondable, the methods and compositions of the invention were devised and found to be successful in creating a bondable surface on thermoplastic surfaces such as thermoplastic urethane panels.

In the methods of the invention, a bondable substrate such as a fiberglass sheet, is attached to the thermoplastic material (e.g., urethane honeycomb panel) to which a secondary material is to be bonded. The invention provides chemical, mechanical and heat lamination methods for the attachment of the bondable substrate to the thermoplastic material. The resulting bond of the bondable substrate to the thermoplastic material is typically and preferably primarily mechanical. For instance, the mechanical methods of attachment, such as threads or staples, hold the bondable substrate to the thermoplastic material with mechanical forces. The thermoplastic cement and heat lamination methods result in the formation of a thermoplastic matrix on the surface of the thermoplastic material which partially envelops the bond enhancement substrate to make the bond enhancement layer i.e., the bond enhancement substrate is embedded in the surface of the thermoplastic material. Thus, the primary force adhering the bond enhancement substrate to the thermoplastic panel is the mechanical strength of the matrix which the bond enhancement substrate is embedded in.

Once the bondable substrate is attached to the thermoplastic material to make a bondable bond enhancement layer, secondary materials such as thermoplastic plastics, thermosetting plastics, metals (steel aluminum, tin, copper, etc.), woods, papers, fiberglass, composites, aggregates, building materials and the like can be adhered to the bond enhancement layer with appropriate adhesives. This results in laminates such as those which comprise the honeycomb panel described in FIG. 1.

Figure 1:
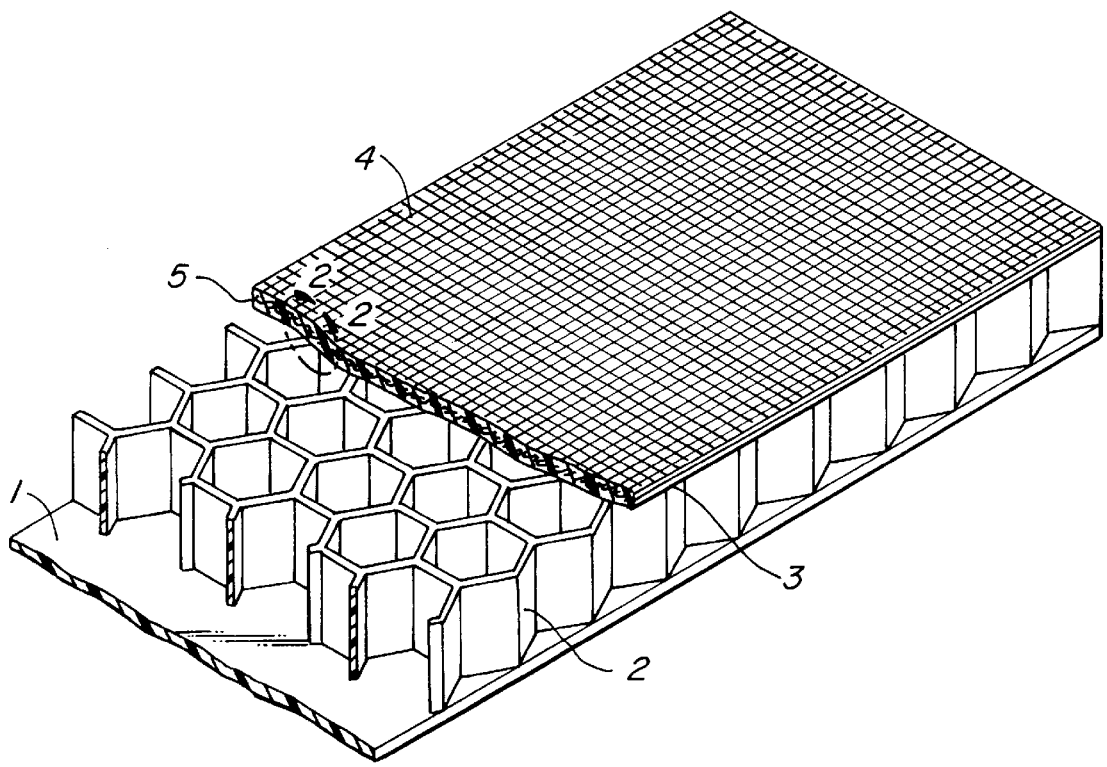
FIG. 1 is a top view cutaway drawing of a bond enhanced honeycomb panel of the invention.

FIG. 1 is a cutaway drawing of an exemplar bond-enhanced honeycomb panel constructed according to the invention. Thermoplastic panel 1 is cemented or heat welded to honeycomb array 2, which is cemented or welded to thermoplastic panel 3. Top surface 4 of thermoplastic panel 3 has bond enhancement layer 5 embedded in the matrix of thermoplastic panel 3.

Figure 2:
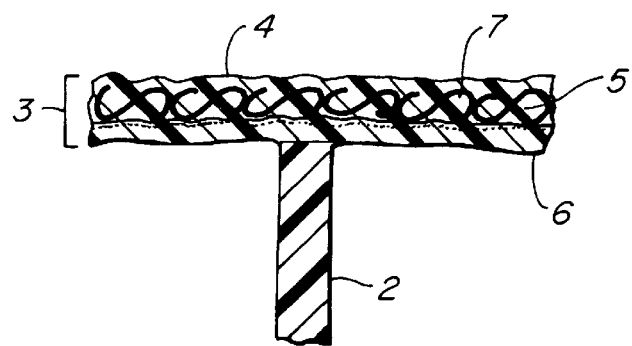
FIG. 2 is a cross section of a thermoplastic panel bonded to a honeycomb array in a bond enhanced honeycomb panel of the invention.

FIG. 2 is an expanded cross section of thermoplastic panel 3. Bond enhancement layer 5 typically does not extend all of the way through thermoplastic panel 5, and bottom 6 of thermoplastic panel 3 is typically a smooth thermoplastic surface. Bond enhancement layer 5 is embedded in thermoplastic matrix 7 of thermoplastic panel 3, and extends through top surface 4 of thermoplastic panel 3.

In a preferred embodiment, thermoplastic panel 1 has a bond enhancement layer embedded in the surface of the panel which faces away from honeycomb array 2, in an arrangement similar to that of thermoplastic panel 3. In this embodiment, the honeycomb panel has bond enhancement layers on the top and bottom of the honeycomb panel.

In preferred embodiments, the bond enhanced honeycomb panel is adhered to a second surface such as a thermoset plastic or metal panel using an adhesive. The adhesive adheres to bond enhancement layer 5 at the and to the second surface.

Making Thermoplastics

The present invention describes methods of improving the bondability of thermoplastics. It is expected that one of skill is thoroughly familiar with the manufacture of thermoplastics, including thermoplastic panels. A general introduction to thermoplastics, and to plastics in general, is found in *Kirk-Othmer Encyclopedia of Chemical Technology* third and fourth editions, esp. volume 18 and volume 23, Martin Grayson, Executive Editor, Wiley-Interscience, John Wiley and Sons, N.Y., and in the references cited therein ("Kirk-Othmer"). Accordingly, the following discussion of thermoplastics is for exemplary purposes, and no attempt is made to catalogue or describe thermoplastic manufacture in detail.

Many of the resins commonly used as industrial building materials are thermoplastics. These include crystalline resins such as various polyethelenes, nylons and polyesters, and amorphous thermoplastics such as acrylo-nitrile-butadine-styrene terpolymers (ABS plastics), cellulose acetate, phenylene oxide based resins, polycarbonates, poly(methyl methacrylate) (PMMA), polystyrene, polyvinylchloride (PVC), styrene-acrylonitrile copolymers (SAN) and various urethanes.

Raw resins are available from a variety of commercial sources, typically in the form of pellets. Thermoplastics are typically processed into components such as panels using known techniques. These techniques include extrusion, blown film extrusion, cast film extrusion, extrusion of plastic sheets, profile extrusion, extrusion coating, wire coating, injection molding, structural foam molding, rotational molding, thermoforming, cast acrylic sheeting, expandable polystyrene molding, foamed polystyrene sheet extrusion, calendaring, thermosetting, reaction injection molding, and the like. See, Kirk-Othmer, supra.

Urethane Plastics

Urethane plastics are particularly preferred plastics for use in the present invention, and a more extended discussion of urethane plastics appears below. For instance, in one particularly preferred class of embodiments, the present invention provides urethane honeycomb panels to which a bond enhancement substrate is attached. To this bond enhanced urethane panel, a variety of materials can be adhered, including thermosetting urethane foams, such as rigid urethane foams. One of skill will recognize that certain features of the following discussion may be applied to other plastics.

The properties and methods of making thermoplastic and thermosetting urethanes are know. Kirk-Othmer and the references cited therein provide a discussion of urethane polymers, e.g., at volume 23. Polyurethanes contain carbamate groups (—NHCOO—), also referred to as urethane groups, in their backbone structures. In addition to the linear thermoplastic polyurethanes obtained from difunctional monomers, branched or crosslinked urethane polymers are made with higher functional monomers (e.g., using polymeric isothiocyanates, or higher functional polyols).

Linear polymers have good impact strength, and are easily processed, but owing to their thermoplasticity have limited thermal stability. Thermoset polymers, on the other hand, have higher thermal stability, but typically lower impact strength. Accordingly, the ability of the present invention to laminate thermoplastic and thermoset urethane panels provides for both thermal stability and high impact strength in the laminate, which is useful in a variety of contexts, including shipbuilding, automotive and aerospace manufacturing, recreational plastic devices and the like.

The properties of thermoplastic polyurethanes are attributed to their long chain structures. Melt viscosity depends on the average molecular weight of the monomer, and is influenced by chain length and branching. Thermoplastic polyurethanes are viscoelastic materials, which behave like a glassy, brittle solid, an elastic rubber, or a viscous liquid, depending on the temperature. The physical properties of thermoset urethanes such as rigid urethane foams depend on the density of the foam, the catalyst used to set the foam, any surfactant in the foam, the presence of polyols and isocyanates and the type of mixing. A variety of manufacturing techniques are known for both thermoplastic and thermosetting urethanes, and polyurethanes and associated solvents, reagents, catalysts and the like are commercially available from J. P. Stevens (East Hampton, Mass.) as well as other commercial sources such as Akzo, BASF, Dow, Mobay, Olin, Rubicon, Upjohn, Bayer, Takeda, Veba, Eastman, Sun Oil, and other manufacturers known to persons of skill. See also, Kirk Othmer, id.

Honeycomb Panels

Honeycombs are used as structural elements where a combination of lightness and strength is desirable. In one particularly preferred embodiment, urethane honeycomb panels are made bondable by the attachment of a bond enhancement substrate to the honeycomb panel.

Urethane and other plastics have been used in the manufacture of a variety of honeycomb structural elements such as panels. Polyimide film honeycomb materials are described in U.S. Pat. No. 4,921,745. Fiber reinforced polyimide honeycomb structures for high temperature applications are described in allowed U.S. patent application Ser. No. 08/261,377. Formable honeycomb panels are described in U.S. Pat. No. 4,859,517. Methods for making thermally fused thermoplastic honeycomb structures are described in U.S. Pat. No. 5,421,935. Multi-layer honeycomb structures are described in U.S. Pat. No. 5,106,688. The preferred type of honeycomb panels for use in the invention are those described in U.S. Pat. No. 5,421,935. Urethane panels are commercially available from Hexcel (Pleasanton, Calif.).

The following discussion refers to a honeycomb panel for exemplary purposes. One of skill would understand that the techniques apply to other plastic materials such as flat urethane panels.

A bond enhancement substrate (typically a fiberglass sheet) is attached to the honeycomb panel by any of the methods described herein. Preferred methods include mechanical attachment, thermoplastic cements, and heat lamination.

Mechanical attachment can be accomplished by a variety of known techniques, including staples, threads (i.e., the bond enhancement can be sewed to the honeycomb), screws, nails, rivets, buttons and other fasteners. These methods are not typically used where the honeycomb panel is to be submersed in a liquid, because puncturing the panel can result in leaks in the panel. Thus, for waterproof applications, heat lamination and thermoplastic cements are preferred.

In a particularly preferred embodiment, the bond enhancement layer is cemented to the honeycomb panel. For instance, where the honeycomb panel is a urethane honeycomb panel, a preferred cement is 30% thermoplastic urethane dissolved in N-methyl-2-pyrolidone. The thermoplastic cement is applied to the panel using a roller or brush, and the bond enhancement substrate is applied to the softened surface of the panel (the solvent softens the urethane panel). Wrinkles are removed from the bond enhancement substrate by running a roller over the bond enhancement substrate. Alternatively, the cement can be applied directly to the bond enhancement substrate, which is then applied to the panel using a roller to eliminate wrinkles. The thermoplastic cement is then allowed to cure, typically under vacuum until the thermoplastic is hardened. Either of these procedures results in the bond enhancement substrate being embedded in the surface of the urethane panel.

In another particularly preferred embodiment, the bond enhancement substrate is attached to the honeycomb panel using a heat lamination technique. In this method, the panel is heated until the surface is soft, and then the bond enhancement material is embedded into the panel e.g., using pressure. The panel is then cured by allowing the panel to cool until hardened.

As discussed in the honeycomb patents and patent application incorporated by reference herein, the honeycomb panel is typically produced with multiple layers, e.g., a flat polyurethane layer or sheet cemented or welded to a comb array, which is cemented or welded to a second flat polyurethane sheet. Either or both surfaces of the honeycomb panel are made bondable by embedding or attaching a bond enhancement substrate in either or both of the flat polyurethane sheets which form the outer walls of the honeycomb panel.

In the mechanical, cement or heat lamination process, the bond enhancement substrate is laminated to a sheet of the overall panel, which is then cemented or welded to the rest of the honeycomb panel. Alternatively, the honeycomb panel can be fully constructed, and the bond enhancement layer or layers added to the outer wall or walls of the honeycomb panel. It will be appreciated that the mechanical and heat lamination methods of adding a bond enhancement substrate can be used on essentially any thermoplastic material, and is in no way limited to a particular thermoplastic, or type of panel.

Bond Enhancement Substrates

A variety of bond enhancement substrates for attachment to thermoplastic panels and other materials can be used in the present invention. Most typically, the bond enhancement substrate will be a fiberglass sheet, which may be a plain or satin weave cloth. Fiberglass sheets are available from a variety of sources including Hexcel Corp., Clark Schweibel, Burlington Glass, Owens Corning Glass, and others known to persons of skill. Typically, the cloth will be between about 1 oz per square foot and 100 oz per square foot, and usually about 10 oz per square foot. However, essentially any material which can be embedded or attached to the surface of the thermoplastic sheet can be substituted, including fibrous materials such as flax or asbestos, dust byproducts of manufacturing materials such as Nomex®, aggregates and the like.

Adhesives

A variety of adhesives can be used to attach the material of choice to a bondable thermoplastic panel or other structure. The selection of adhesive depends on the nature of the bondable layer on the thermoplastic substrate, and upon the nature of the material to which the adhesive material is to be attached. In general, glues, cements, pastes, epoxies, and the like are suitable and widely available, as are mechanical adhesives such as threads, staples and the like. Adhesives are selected based upon the intended application, and it is expected that one of skill is thoroughly familiar with available adhesives and their use. For example, where the application is subjected to water, an adhesive which is waterproof is used. For a discussion of adhesives in particular applications, see, the *Adhesives Red Book* published by Argus Business, a division of Argus, Inc.

EXAMPLES

The following examples are provided by way of illustration only and not by way of limitation. Those of skill will readily recognize a variety of noncritical parameters which could be changed or modified to yield essentially similar results.

Example 1

N-Methyl-2-Pyrolidone Urethane Cement Attachment of A Bondable Substrate to a Honeycomb Thermoplastic Urethane Panel It was discovered that known methods of surface preparation such as sanding, beading, blasting and other mechanical abrasion techniques did not reliably prepare the surfaces of honeycomb thermoplastic urethane panels (See, U.S. Pat. No. 5,421,935) for further bonding. Accordingly, the following method using N-methyl-2-pyrolidone urethane cement to attach a fiberglass cloth to the honeycomb panel to make a bond enhancement layer on the honeycomb panel was devised.

A solution of N-methyl-2-pyrolidone containing about 30% dissolved urethane was applied to the surface of a polyurethane honeycomb panel using paint rollers and/or paint brushes. A layer of plain weave 9.7 oz per square foot fiberglass cloth was then embedded into the softened surface of the honeycomb panel to create a bond enhancement panel with a bondable surface. To make the finished surface as uniform as possible, the entire bond enhanced panel was placed into a vacuum bag, and a vacuum was applied to the assembly overnight. After the assembly had cured overnight it was removed from the bag.

Example 2

Making of a Laminate Comprising Thermoplastic and Thermoset Panels

A particular application of the honeycomb panel/bond enhancement panel made in Example 1 was the lamination of the bond enhanced honeycomb panel to a cold-rolled steel panel to provide structural elements used in ship construction. The honeycomb panel with the bond enhancement layer made according to Example 1 was covered with an urethane adhesive paste on the bondable surface, and the steel panel was adhered to the bondable surface of the honeycomb panel.

All publications, patents and patent applications cited in this specification are herein incorporated by reference for all purposes as if each individual publication patent or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method of making a bondable thermoplastic honeycomb panel, comprising:

providing a layer of honeycomb cells;

heat welding a thermoplastic panel to said layer of honeycomb cells;

applying thermoplastic cement to an outer surface of said thermoplastic panel, where said outer surface is facing away from said honeycomb cells, to soften said outer surface of said thermoplastic panel;

applying a bond enhancement substrate to said outer surface of the thermoplastic sheet; and allowing said thermoplastic cement to cure until said thermoplastic cement is hardened.

2. The method of claim 1, wherein the thermoplastic panel is a polyurethane honeycomb panel.

3. The method of claim 1, wherein the bond enhancement substrate comprises a fiberglass sheet.

4. The method of claim 1, wherein the thermoplastic cement comprises thermoplastic urethane cement.

5. The method of claim 4, wherein the thermoplastic urethane cement comprises an N-methyl 2-Pyrolidine based solvent and about 30% dissolved thermoplastic urethane.

* * * * *